(12) United States Patent
Fukamachi

(10) Patent No.: US 11,390,303 B2
(45) Date of Patent: Jul. 19, 2022

(54) VEHICLE CONTROL DEVICE

(71) Applicant: Toyota Jidosha Kabushiki Kaisha, Toyota (JP)

(72) Inventor: Hideo Fukamachi, Hadano (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 136 days.

(21) Appl. No.: 16/814,205

(22) Filed: Mar. 10, 2020

(65) Prior Publication Data

US 2020/0317227 A1    Oct. 8, 2020

(30) Foreign Application Priority Data

Apr. 4, 2019   (JP) .............................. JP2019-072238

(51) Int. Cl.
*B60W 60/00*   (2020.01)
*G06N 5/04*    (2006.01)
*B60K 35/00*   (2006.01)
*G05D 1/02*    (2020.01)

(52) U.S. Cl.
CPC ......... *B60W 60/0051* (2020.02); *B60K 35/00* (2013.01); *B60W 60/0027* (2020.02); *G05D 1/0214* (2013.01); *G05D 1/0274* (2013.01); *G06N 5/04* (2013.01);
(Continued)

(58) Field of Classification Search
CPC ......... B60W 60/0051; B60W 60/0027; G06N 5/04; B60K 35/00; B60K 2370/166; B60K 2370/152; G05D 1/0214; G05D 1/0274; G05D 2201/0213
See application file for complete search history.

(56) References Cited

U.S. PATENT DOCUMENTS 10,198,009 B2 * 2/2019 Wang ................. G01C 21/3484
2018/0023966 A1   1/2018 Iwai et al.
2018/0292833 A1 * 10/2018 You ...................... G05D 1/0214
(Continued)

FOREIGN PATENT DOCUMENTS

DE    102013210395 B4 *  6/2021 ............ B60W 10/20
EP       3217244 B1 *  4/2021 ............ B60W 50/14
(Continued)

OTHER PUBLICATIONS

U.S. Appl. No. 16/660,274, filed Oct. 22, 2019; Taichi Kawanai, et al.

*Primary Examiner* — Hunter B Lonsberry
*Assistant Examiner* — Harrison Heflin
(74) *Attorney, Agent, or Firm* — Dinsmore & Shohl LLP

(57) ABSTRACT

Permissible level information indicating the highest permissible level of driving assistance control for each of sections on a target route is stored in a storage device. In a first section of the target route, the highest permissible level is a first level. In a second section that follows the first section, the highest permissible level is a second level higher than the first level. In a third section that follows the second section, the highest permissible level is a third level different from the second level. In a case where the length of the second section or a passage time taken for a vehicle to pass through the second section is smaller than a threshold value, the processor performs a level maintenance process of maintaining the selection level in the second section at a level equal to the selection level in the first section.

10 Claims, 13 Drawing Sheets

(52) U.S. Cl.
CPC .. *B60K 2370/152* (2019.05); *B60K 2370/166* (2019.05); *G05D 2201/0213* (2013.01)

(56) References Cited

U.S. PATENT DOCUMENTS

| | | | |
|---|---|---|---|
| 2019/0049259 A1* | 2/2019 | Galan-Oliveras | ........................... G01C 21/3461 |
| 2019/0186947 A1* | 6/2019 | Rockmore | ............ B60W 50/14 |
| 2019/0294173 A1* | 9/2019 | Szubbocsev | ....... G01C 21/3469 |
| 2020/0356100 A1* | 11/2020 | Nagarajan | .......... G01C 21/3602 |

FOREIGN PATENT DOCUMENTS

| | | |
|---|---|---|
| JP | 2016-057655 A | 4/2016 |
| WO | 2016139748 A1 | 9/2016 |

* cited by examiner

FIG. 6
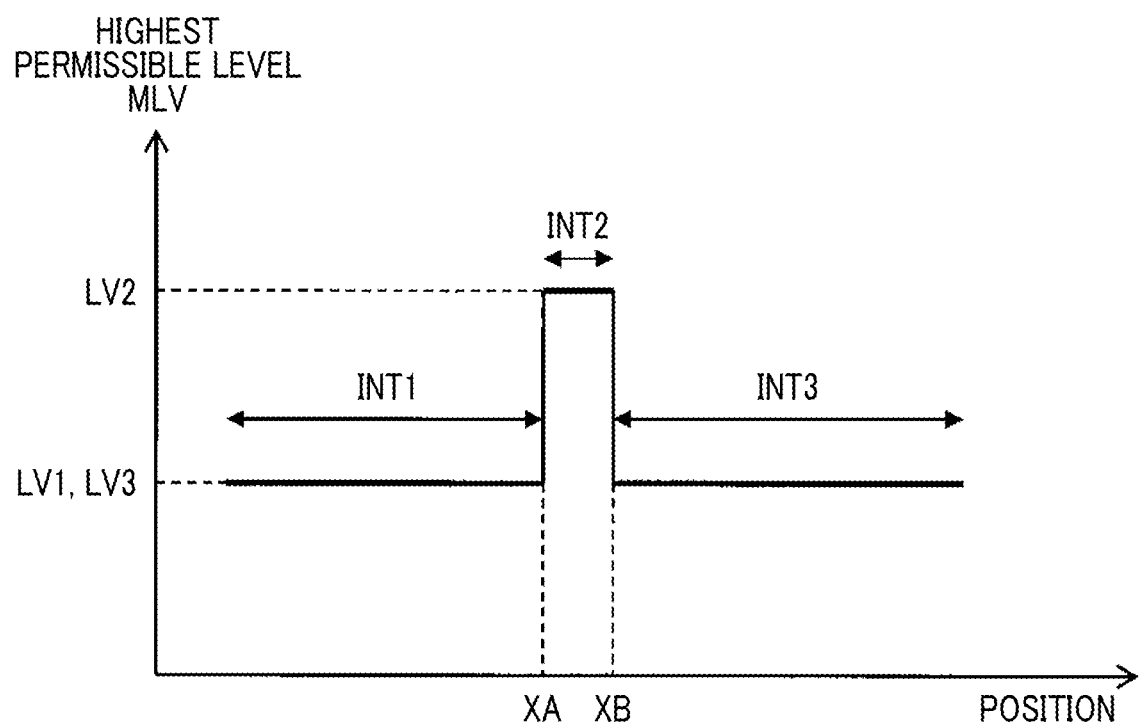
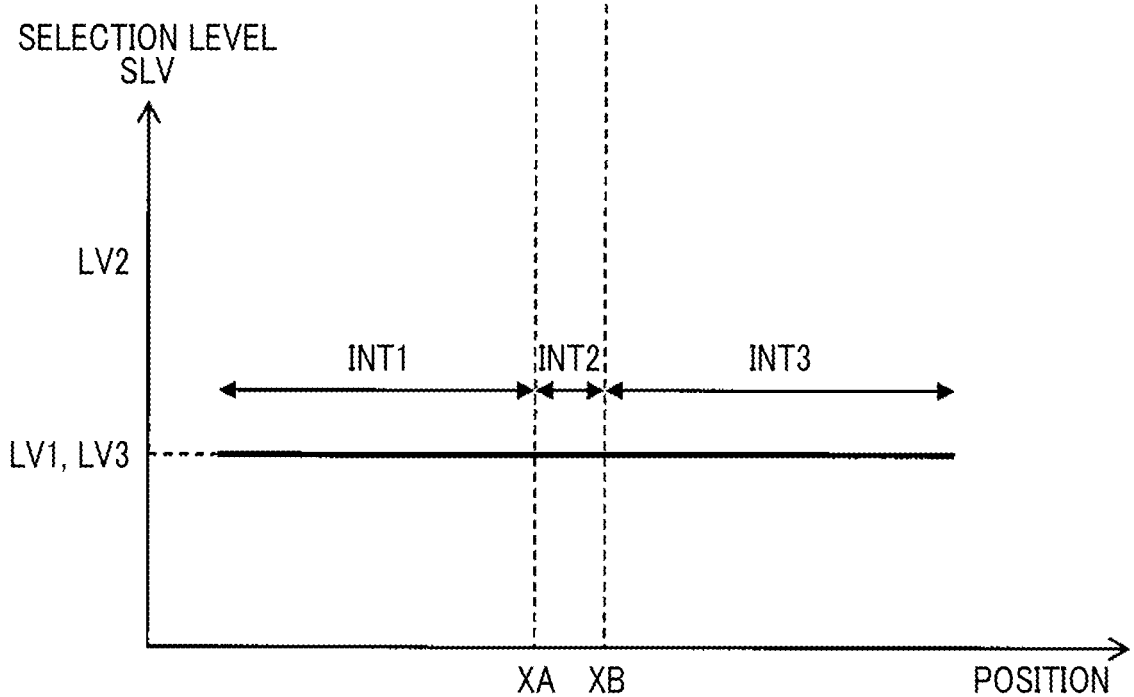

FIG. 7
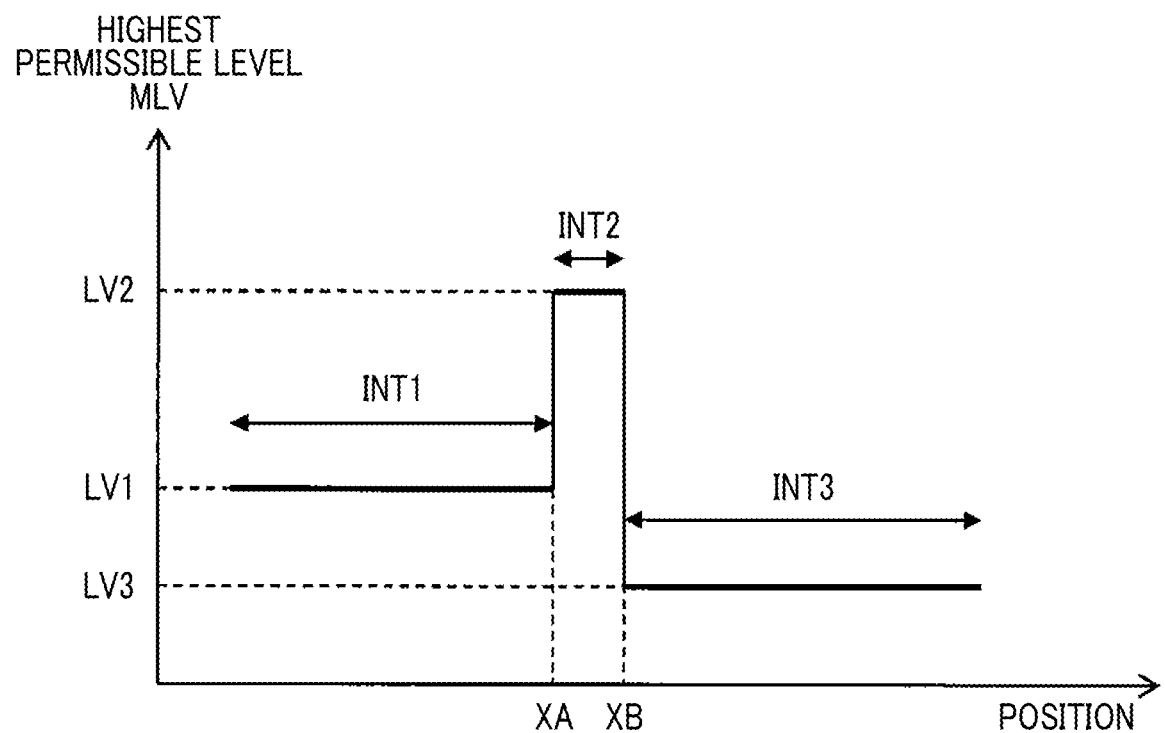
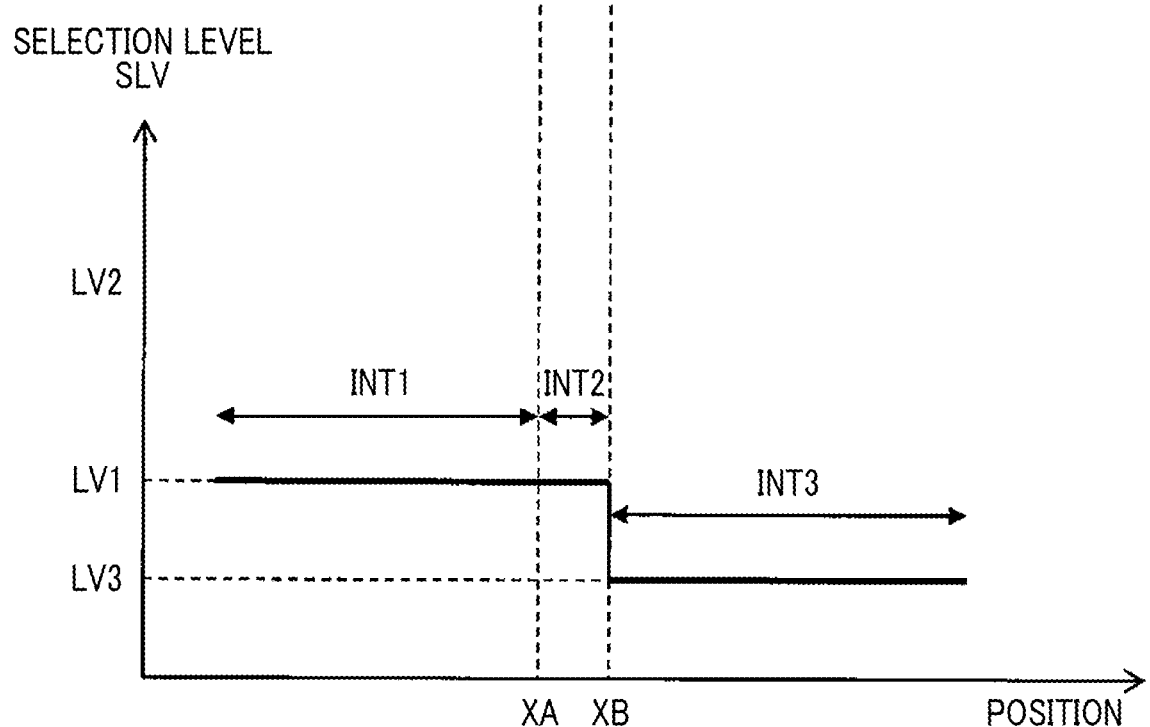

FIG. 8
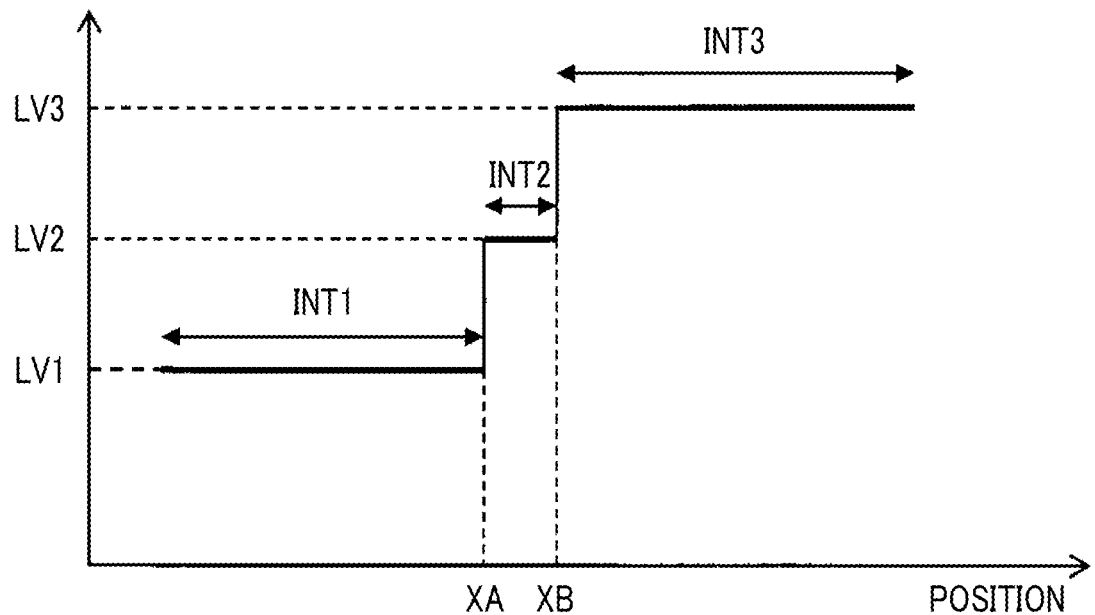
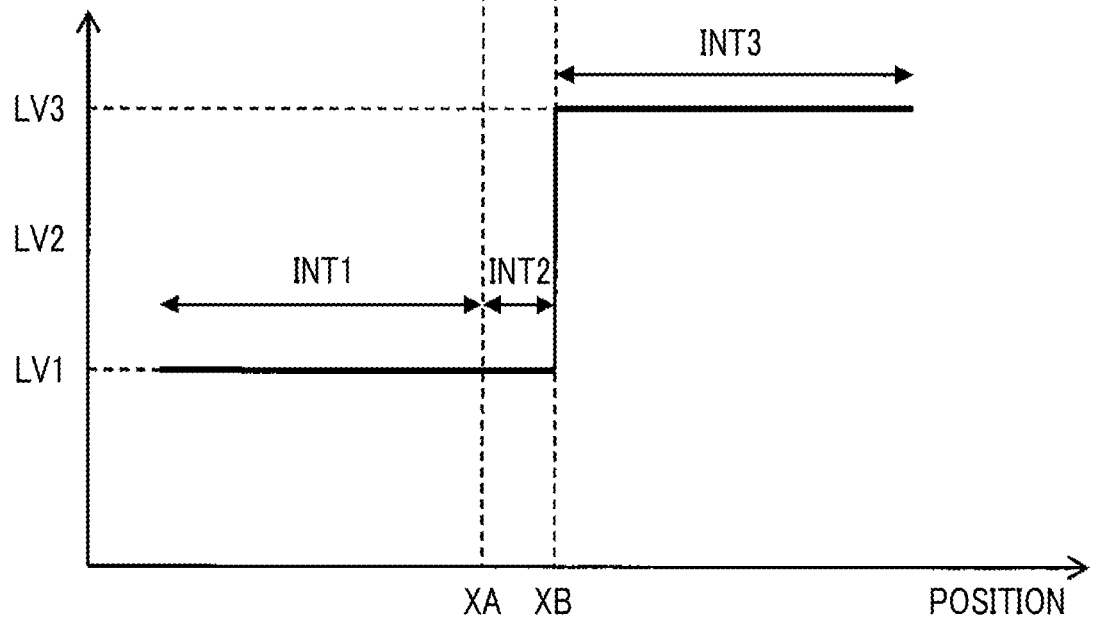

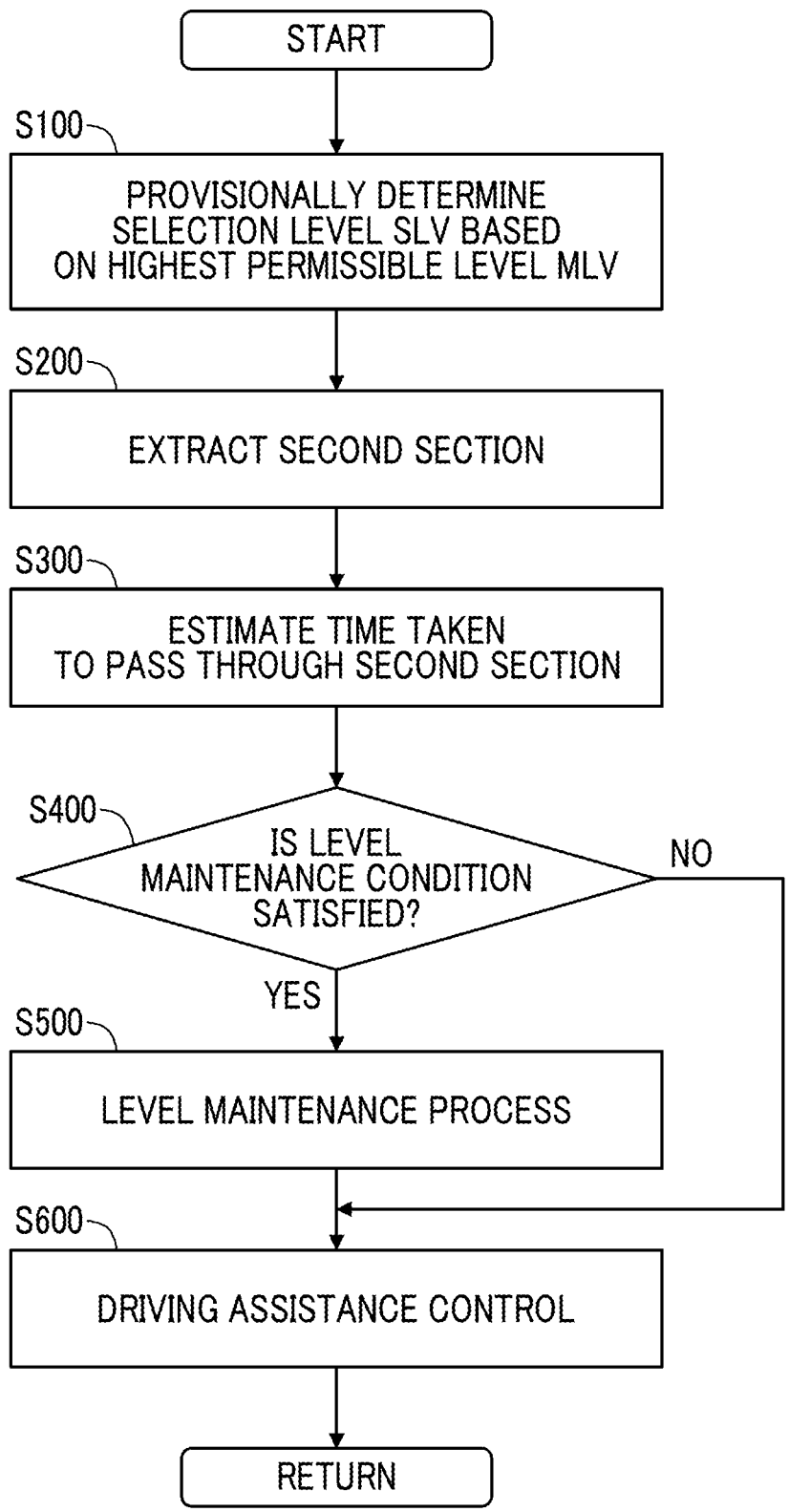

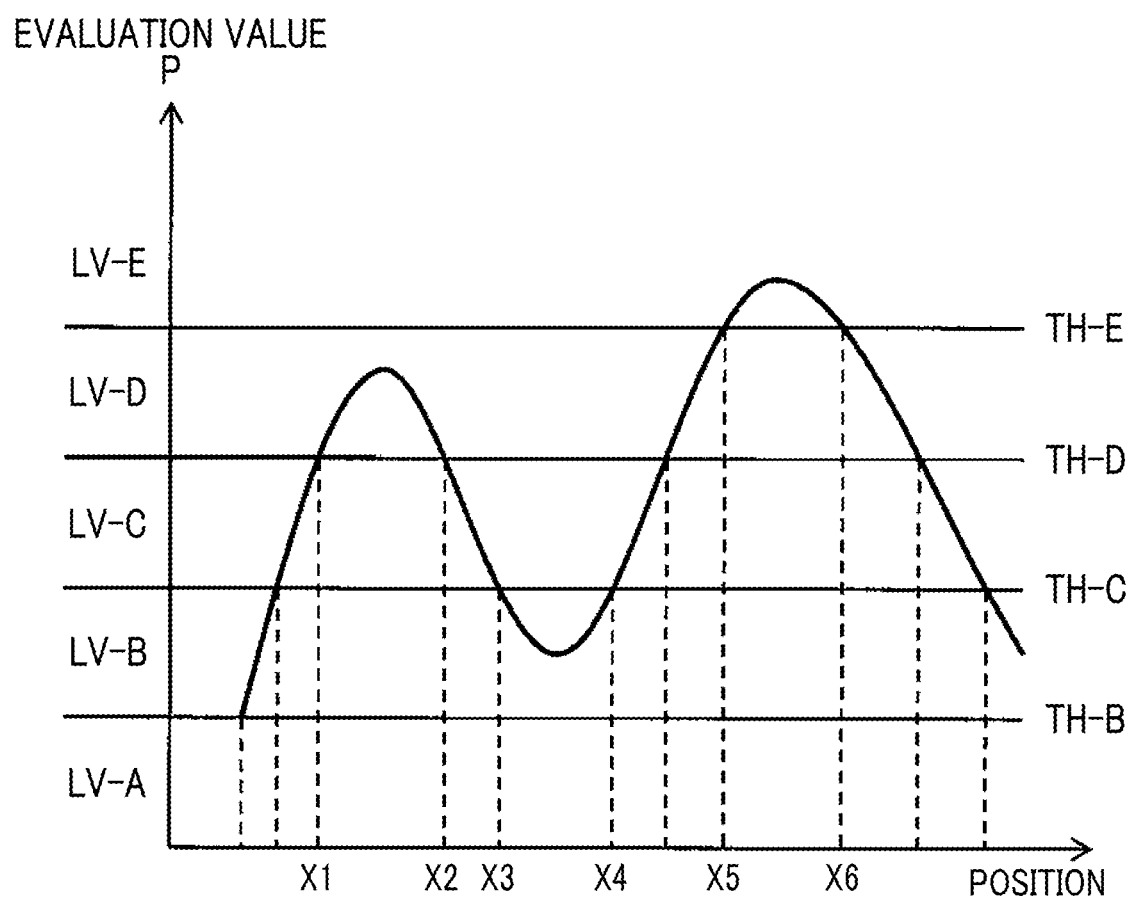

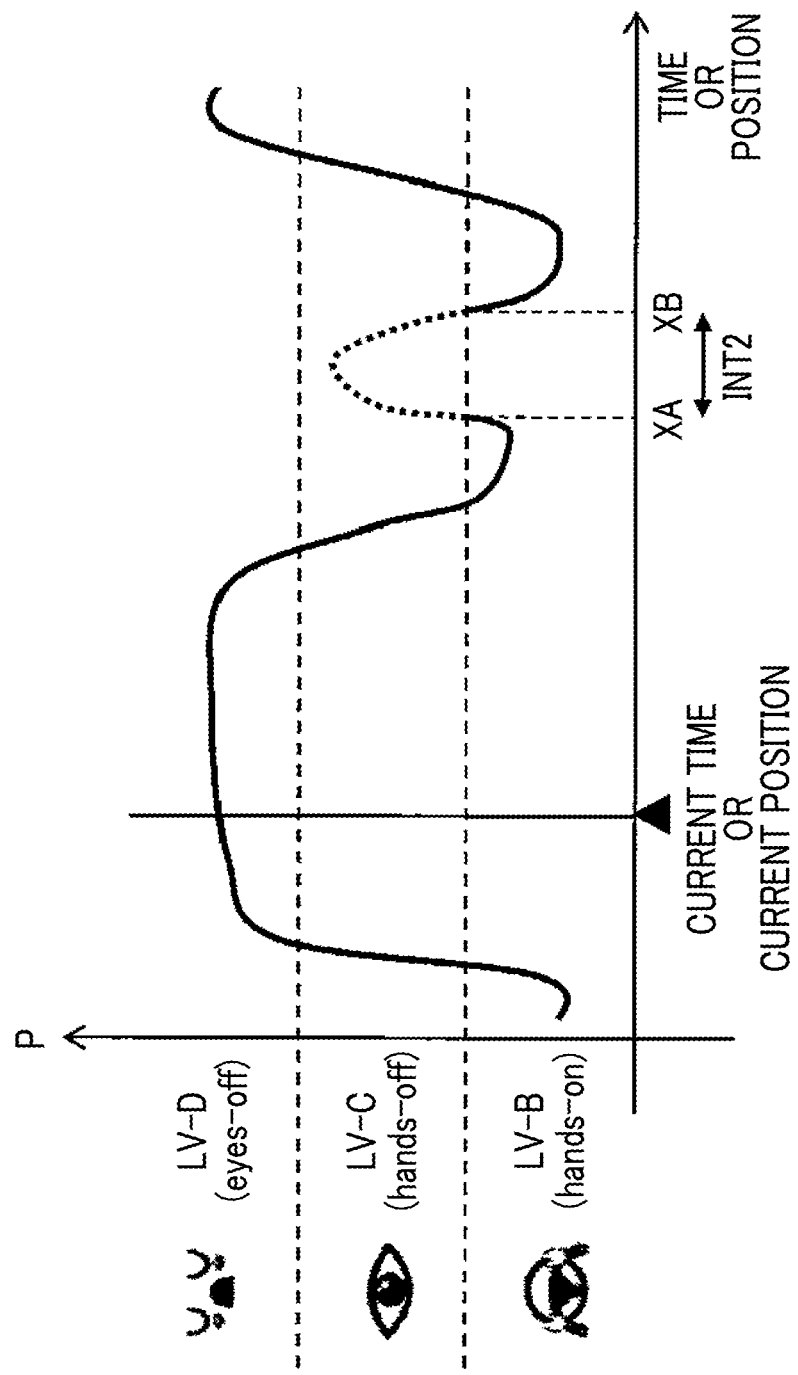

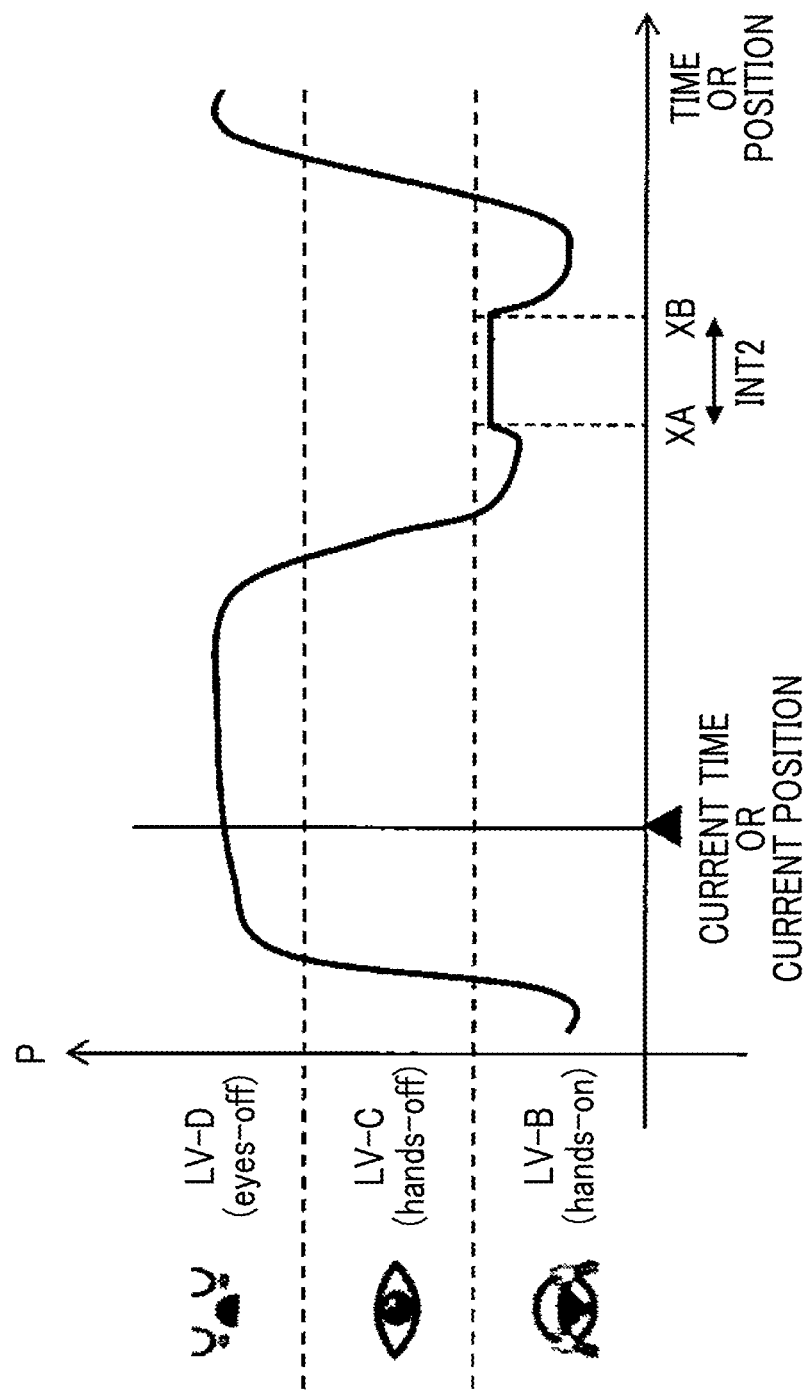

VEHICLE CONTROL DEVICE

CROSS-REFERENCE TO RELATED APPLICATIONS

This application claims priority to Japanese Patent Application No. 2019-072238 filed on Apr. 4, 2019, which is incorporated herein by reference in its entirety including the specification, drawings and abstract.

BACKGROUND

1. Technical Field

The present disclosure relates to a vehicle control device that performs driving assistance control which assists in driving a vehicle.

2. Description of Related Art

WO 2016/139748 discloses a route search device that notifies a user of a point where autonomous driving is difficult to be performed. The point where autonomous driving is difficult to be performed is a point where sensor detection accuracy does not satisfy a criteria for acquisition of periphery information that is needed for autonomous driving. Examples of the point where autonomous driving is difficult to be performed include a heavy rain section, a frozen road section, a dense fog section, and a section where a sensor cannot detect a white line or a sign. The route search device predicts a point where autonomous driving is difficult to be performed and notifies a user of the predicted point where autonomous driving is difficult to be performed.

SUMMARY

Driving assistance control which assists in driving a vehicle will be described. The driving assistance control is classified into a plurality of levels (stages). A driving assistance level that can be realized may depend on the position. Therefore, driving assistance levels may be switched while a vehicle is traveling.

A sensor, information, and the content of processing needed for the driving assistance control depend on the driving assistance level. In a case where driving assistance levels are switched, a vehicle control device needs to switch a sensor to be used, information, and the content of processing. In addition, there is a case where a traveling plan for the driving assistance control needs to be re-planned in accordance with the switching of driving assistance levels. Accordingly, when driving assistance levels are switched frequently in a short period of time, a processing load on the vehicle control device is increased and thus the processing performance of the vehicle control device is decreased.

The present disclosure provides a technique with which it is possible to restrain driving assistance levels from being switched frequently in a short period of time.

An aspect of the present disclosure relates to a vehicle control device configured to perform driving assistance control which assists in driving a vehicle. The vehicle control device includes a storage device and a processor. Permissible level information indicating the highest permissible level of the driving assistance control for each of sections on a target route is stored in the storage device. The processor is configured to determine, based on the permissible level information, a selection level equal to or lower than the highest permissible level for each of the sections and to perform the driving assistance control at the selection level. The target route includes a first section in which the highest permissible level is a first level, a second section that follows the first section and in which the highest permissible level is a second level higher than the first level, and a third section that follows the second section and in which the highest permissible level is a third level different from the second level. In a case where the length of the second section or a passage time taken for the vehicle to pass through the second section is smaller than a threshold value, the processor performs a level maintenance process of maintaining the selection level in the second section at a level equal to the selection level in the first section.

In the vehicle control device according to the aspect of the present disclosure, the processor may estimate the passage time based on the speed of the vehicle in a section preceding the second section, a speed history of the vehicle in the second section, or the speed limit in the second section.

In the vehicle control device according to the aspect of the present disclosure, the processor may enable or disable the level maintenance process in accordance with designation of a user of the vehicle.

In the vehicle control device according to the aspect of the present disclosure, the processor may perform the driving assistance control based on map information. The evaluation value of the map information may indicate the certainty of the map information for each of positions in an absolute coordinate system. The highest permissible level may be determined in advance based on the evaluation value. The highest permissible level determined in a case where the evaluation value is equal to or larger than a threshold value may be higher than the highest permissible level determined in a case where the evaluation value is smaller than the threshold value.

In the vehicle control device according to the aspect of the present disclosure, evaluation value information indicating the evaluation value for each of the positions on the target route may be further stored in the storage device. The processor may cause a display device to display a change in evaluation value along the target route, based on the evaluation value information.

In the vehicle control device according to the aspect of the present disclosure, the processor may make a display mode for the evaluation value with respect to the second section different from a display mode for the evaluation value with respect to other sections in a case where the level maintenance process is performed.

In the vehicle control device according to the aspect of the present disclosure, a first evaluation value range may be a range of evaluation values corresponding to the selection level in the first section. The processor may correct the evaluation value in the second section to fall within the first evaluation value range and cause the display device to display the evaluation value after the correction in a case where the level maintenance process is performed.

In the vehicle control device according to the aspect of the present disclosure, the processor may cause a display device to display a change in highest permissible level along the target route based on the permissible level information. The processor may make a display mode for the highest permissible level with respect to the second section different from a display mode for the highest permissible level with respect to other sections in a case where the level maintenance process is performed.

In the vehicle control device according to the aspect of the present disclosure, the processor may cause a display device to display a change in selection level along the target route while displaying no highest permissible level.

The highest permissible level of the driving assistance control is different for each of the sections on the target route. The highest permissible level in the second section that follows the first section is higher than the highest permissible level in the first section. In the second section, the selection level of the driving assistance control can be raised to be higher than that in the first section.

However, in a case where the length of the second section or a time taken to pass through the second section is smaller than the threshold value, the level maintenance process is performed with respect to the second section. Due to the level maintenance process, the selection level in the second section is maintained at a level equal to the selection level in the first section. Although the selection level can be raised in practice, the selection level is maintained equal intentionally. Accordingly, the selection level is restrained from being switched frequently in a short period of time. Since the selection level is restrained from being switched frequently, a decrease in processing performance of the vehicle control device is also suppressed.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 6 is a conceptual diagram illustrating an example of a level maintenance process performed by a vehicle control device according to the embodiment of the present disclosure;

FIG. 7 is a conceptual diagram illustrating another example of the level maintenance process performed by the vehicle control device according to the embodiment of the present disclosure;

FIG. 8 is a conceptual diagram illustrating still another example of the level maintenance process performed by the vehicle control device according to the embodiment of the present disclosure;

FIG. 9 is a flowchart illustrating a process relating to the driving assistance control that is performed by the vehicle control device according to the present embodiment;

FIG. 10 is a conceptual diagram for describing map information and an evaluation value in the embodiment of the present disclosure;

FIG. 11 is a conceptual diagram for describing an example of a method of determining the highest permissible level based on an evaluation value according to the embodiment of the present disclosure;

FIG. 14 is a conceptual diagram for describing a first example of the information displaying process performed by the vehicle control device according to the embodiment of the present disclosure; and FIG. 15 is a conceptual diagram for describing a second example of the information displaying process performed by the vehicle control device according to the embodiment of the present disclosure.

DETAILED DESCRIPTION OF EMBODIMENTS

An embodiment of the present disclosure will be described with reference to attached drawings.

1. Outline of Driving Assistance Control

Figure 1:
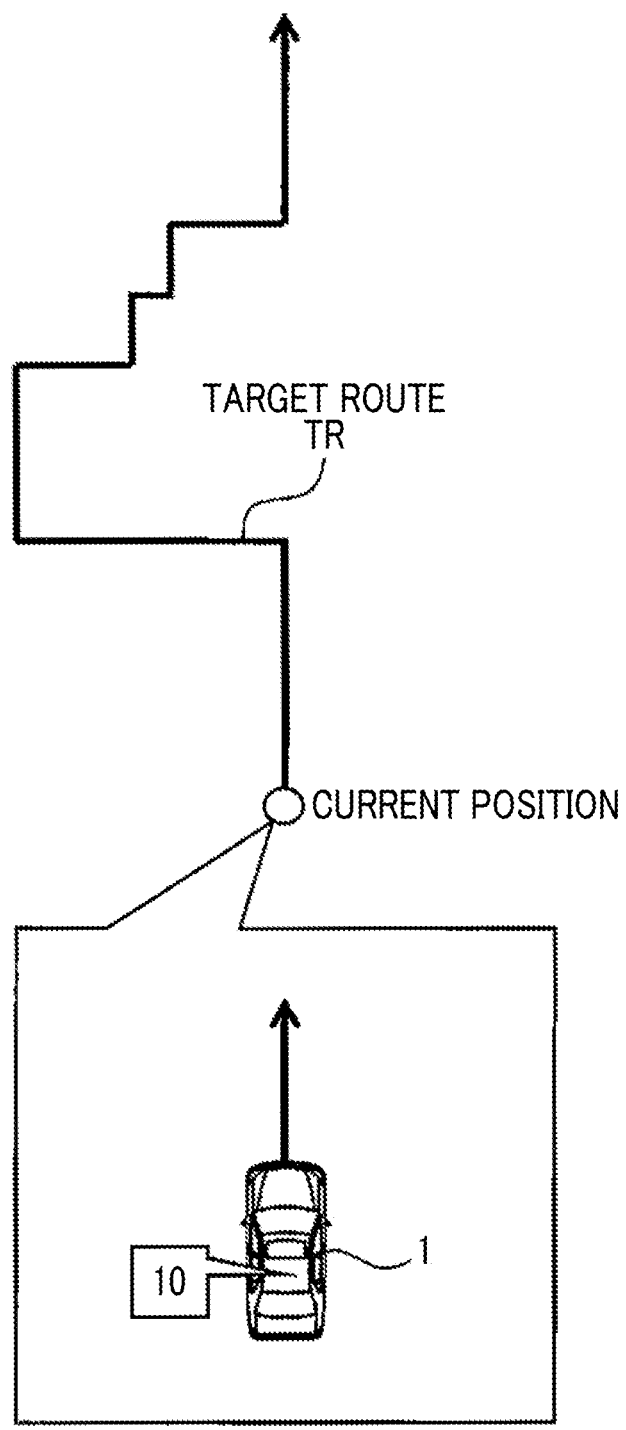
FIG. 1 is a conceptual diagram for describing driving assistance control according to an embodiment of the present disclosure.

FIG. 1 is a conceptual diagram for describing driving assistance control according to the embodiment. A driving assistance system 10 is installed in a vehicle 1. The driving assistance system 10 performs "driving assistance control" that assists in driving the vehicle 1.

The driving assistance control includes at least one of steerage control, acceleration control, and deceleration control. Examples of such driving assistance control include autonomous driving control, trajectory-following control, lane tracing assist control, collision avoidance control, and adaptive cruise control (ACC).

In the following description, a case where the vehicle 1 travels along a target route TR determined in advance will be described. The target route TR is determined based on a current position and a destination, for example. When the vehicle 1 travels along the target route TR, the driving assistance system 10 performs the driving assistance control.

In the present embodiment, the driving assistance control is classified into a plurality of levels (stages). Hereinafter, the level of the driving assistance control will be referred to as a "driving assistance level". The plurality of driving assistance levels can be compared with each other in terms of rank. The higher a driving assistance level, the larger the number of driving operations carried out by the driving assistance system 10. It can be said that a driving assistance level indicates a degree to which a driver delegates the driving of the vehicle 1 to the driving assistance system 10 (degree of delegation).

Figure 2:
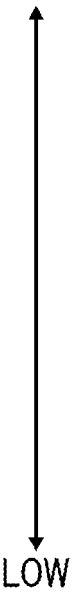
FIG. 2 is a conceptual diagram for describing an example of a plurality of driving assistance levels according to the embodiment of the present disclosure.

FIG. 2 is a conceptual diagram for describing an example of the driving assistance levels. A driving assistance level LV-A is the lowest driving assistance level and a driving assistance level LV-E is the highest driving assistance level. For example, the contents of the driving assistance levels LV-A to LV-E are as follows.

[LV-A] Elementary driving assistance control (example: adaptive cruise control)

[LV-B] Limited driving assistance control (example: adaptive cruise control+lane tracing assist control)

[LV-C] The driving assistance system 10 performs steerage control. The hands of the driver may be separated from a steering wheel (hands-off). The driver is requested to monitor the situation in the vicinity of the vehicle 1. The driver performs manual driving as needed.

[LV-D] The driving assistance system 10 performs all of steerage control, acceleration control, and deceleration control. A driver does not need to monitor the situation in the vicinity of the vehicle 1 (eyes-off). However, in an emergency situation, the driving assistance system 10 issues a "transition demand" to request the driver to start manual driving. The driver starts manual driving within a predetermined time in response to the transition demand.

[LV-E] The driving assistance system 10 performs all of steerage control, acceleration control, and deceleration control. A driver does not need to monitor the situation in the vicinity of the vehicle 1. In an emergency situation, the driving assistance system 10 causes the vehicle 1 to move to a safe place autonomously.

Note that, the way in which the driving assistance levels are classified is not limited to that shown in FIG. 2. For example, each driving assistance level may be divided into finer stages. As another example, the way in which the driving assistance levels are classified may coincide with a general way in which autonomous driving levels are classified.

A driving assistance level that can be realized by the driving assistance system 10 may depend on the position. The highest driving assistance level that can be realized will be referred to as the "highest permissible level MLV", hereinafter.

Figure 3:
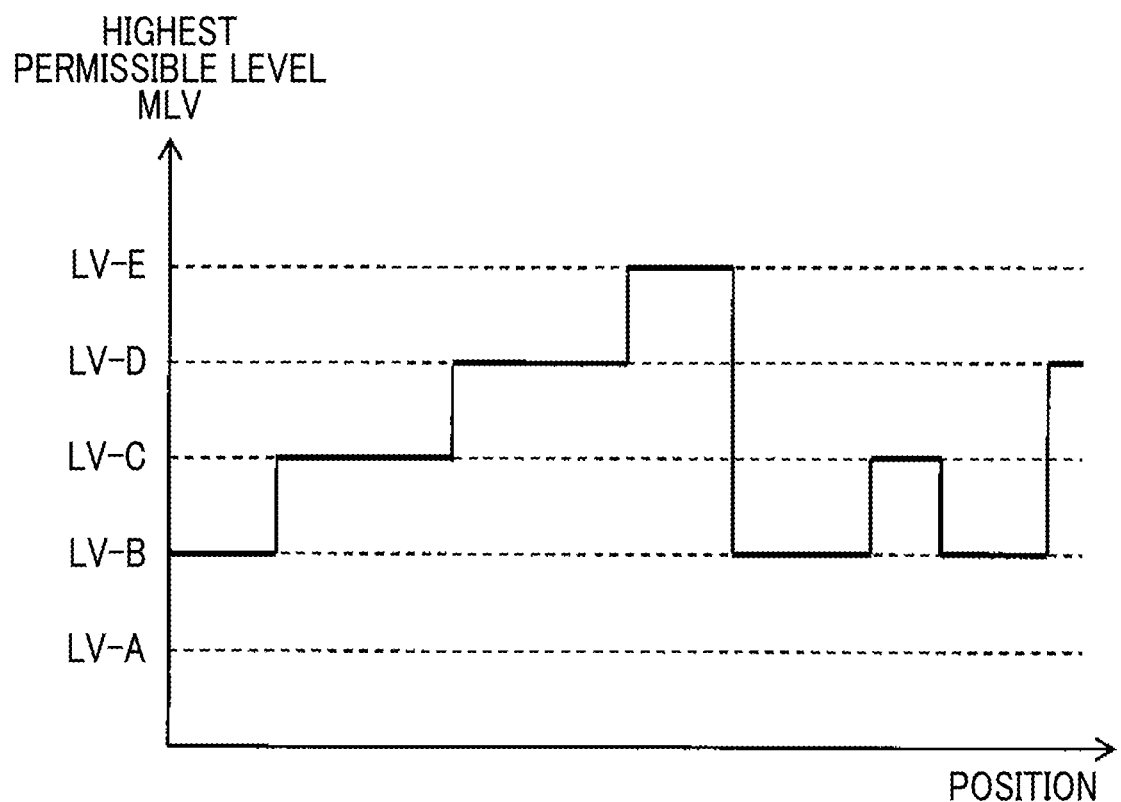
FIG. 3 is a conceptual diagram illustrating an example of the distribution of the highest permissible levels along a target route according to the embodiment of the present disclosure.

FIG. 3 illustrates an example of the distribution of the highest permissible levels MLV along the target route TR. The horizontal axis represents a position on the target route TR and the vertical axis represents the highest permissible level MLV. The highest permissible level MLV fluctuates without being constant along the target route TR. Hereinafter, each area where the highest permissible level MLV is maintained at a certain level will be referred to as a "section". The highest permissible level MLV for each section is determined in advance (example of method of determining highest permissible level MLV will be described later). The driving assistance system 10 recognizes the highest permissible level MLV and performs the driving assistance control at a level equal to or lower than the highest permissible level MLV, for each section on the target route TR.

Hereinafter, the driving assistance system 10 according to the present embodiment will be described in more detail.

2. Driving Assistance System

2-1. Overall Configuration

Figure 4:
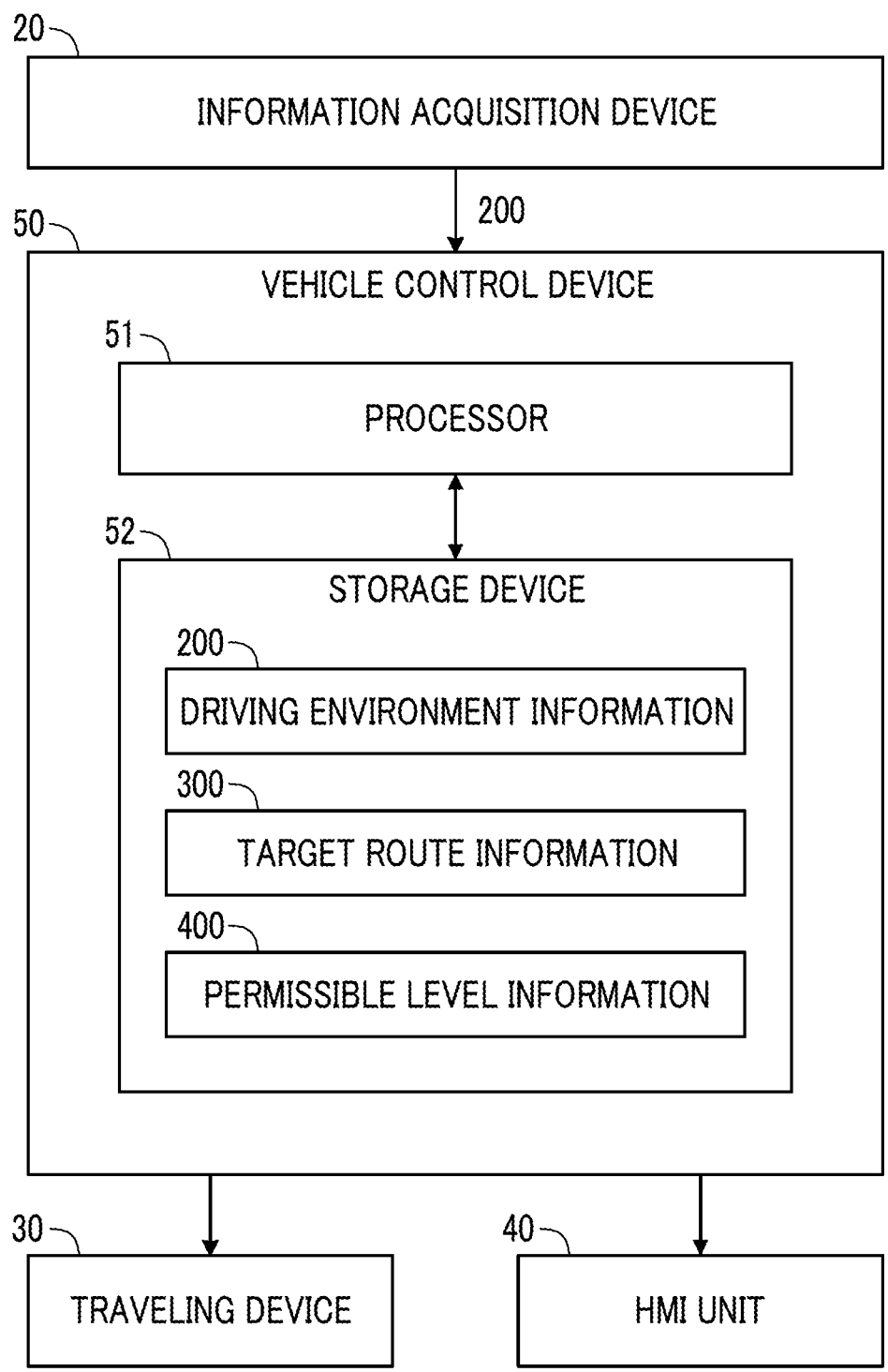
FIG. 4 is a block diagram schematically illustrating an example of the configuration of a driving assistance system according to the embodiment of the present disclosure.

FIG. 4 is a block diagram schematically illustrating an example of the configuration of the driving assistance system 10 according to the present embodiment. The driving assistance system 10 is provided with an information acquisition device 20, a traveling device 30, a human-machine interface (HMI) unit 40, and a vehicle control device 50.

2-2. Information Acquisition Device 20

The information acquisition device 20 acquires information needed for the driving assistance control. The information needed for the driving assistance control is information indicating a driving environment of the vehicle 1 and will be referred to as "driving environment information 200", hereinafter.

Figure 5:
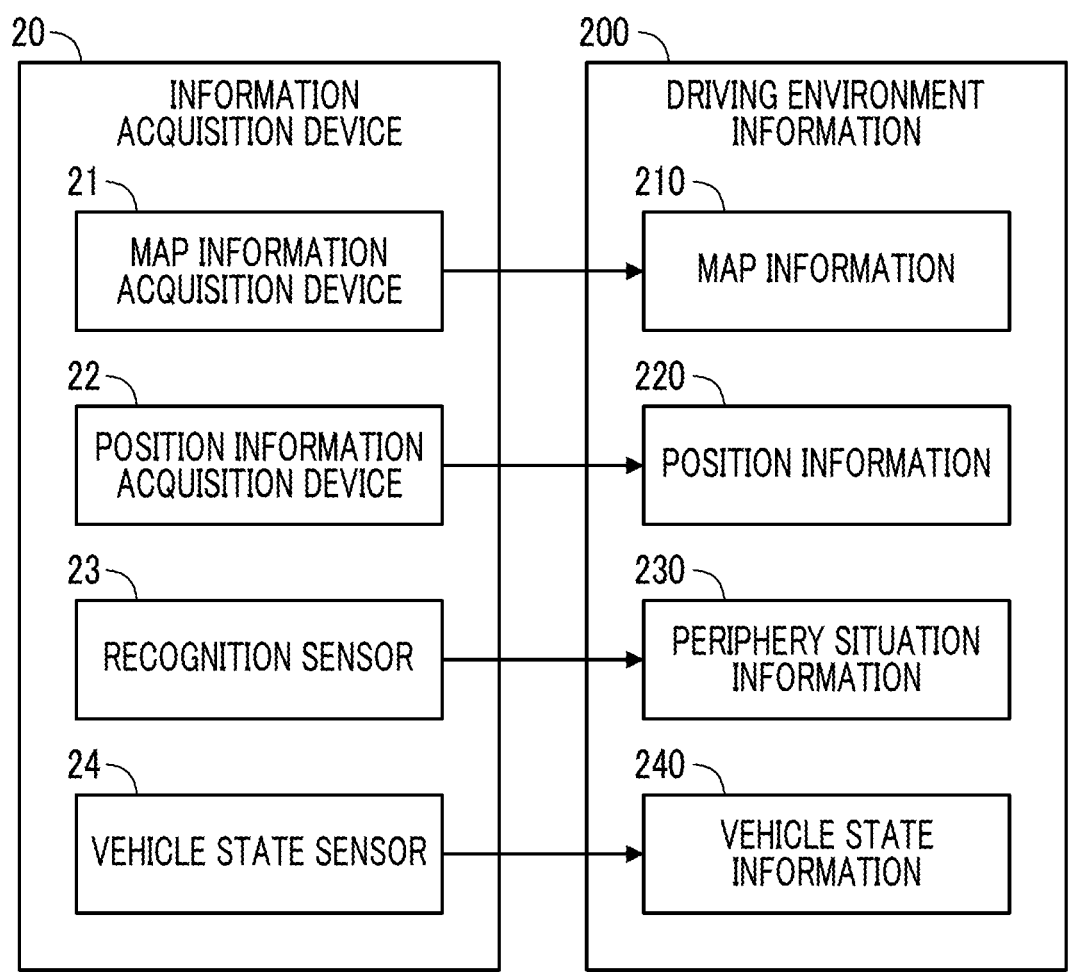
FIG. 5 is a block diagram illustrating an example of an information acquisition device and driving environment information in the driving assistance system according to the embodiment of the present disclosure.

FIG. 5 is a block diagram illustrating an example of the information acquisition device 20 and the driving environment information 200. The information acquisition device 20 is provided with a map information acquisition device 21, a position information acquisition device 22, a recognition sensor 23, and a vehicle state sensor 24. The driving environment information 200 includes map information 210, position information 220, periphery situation information 230, and vehicle state information 240.

The map information acquisition device 21 acquires the map information 210. The map information 210 includes general roadmap information indicating the arrangement of lanes or the shape of a road. Furthermore, the map information 210 may include high-level map information needed for high-level driving assistance control. Examples of the high-level map information include map information indicating the position of a stationary object on a road (example: guardrail and wall), a road surface, a characteristic object (example: white line, pole, and signboard), or the like. The map information acquisition device 21 acquires the map information 210 of an area that needs to be acquired, from a map database. The map database may be stored in a predetermined storage device installed in the vehicle 1 and may be stored in a management server outside the vehicle 1. In the latter case, the map information acquisition device 21 communicates with the management server to acquire the map information 210 that needs to be acquired.

The position information acquisition device 22 acquires the position information 220 indicating the position and the posture of the vehicle 1. For example, the position information acquisition device 22 includes a global positioning system (GPS) device that measures the position and the orientation of the vehicle 1. The position information acquisition device 22 may further include a posture sensor that detects the posture of the vehicle 1.

The recognition sensor 23 recognizes (detects) the situation in the vicinity of the vehicle 1. For example, the recognition sensor 23 includes a camera, a laser imaging detection and ranging (LIDAR) and a radar. The periphery situation information 230 indicates the result of recognition performed by the recognition sensor 23. For example, the periphery situation information 230 includes object information relating to an object recognized by the recognition sensor 23. Examples of the object include a white line, a nearby vehicle, an obstacle, and a roadside object.

The vehicle state sensor 24 acquires the vehicle state information 240 indicating the state of the vehicle 1. For example, the vehicle state sensor 24 includes a vehicle speed sensor, a yaw rate sensor, an acceleration sensor, and a steering angle sensor. The vehicle speed sensor measures the vehicle speed (speed of vehicle 1). The yaw rate sensor measures the yaw rate of the vehicle 1. The acceleration sensor measures the acceleration (lateral acceleration, forward-backward acceleration, vertical acceleration) of the vehicle 1. The steering angle sensor measures the steering angle of the vehicle 1.

2-3. Traveling Device 30

The traveling device 30 includes a steering device, a drive device, and a braking device. The steering device steers the wheels of the vehicle 1. For example, the steering device includes an electric power steering (EPS) device. The drive device is a drive source that generates a drive power.

Examples of the drive device include an engine, an electric motor, and an in-wheel motor. The braking device generates a braking force.

2-4. HMI Unit 40

The HMI unit 40 is an interface for providing information to the driver and receiving information from the driver. Specifically, the HMI unit 40 includes an input device and an output device. Examples of the input device include a touch panel, a switch, and a microphone. Examples of the output device include a display device and a speaker.

2-5. Vehicle Control Device 50

The vehicle control device 50 is provided with a processor 51 and a storage device 52. The vehicle control device 50 is, for example, a microcomputer. The storage device 52 stores various kinds of information. The processor 51 performs various processes by executing a computer program. The computer program is stored in the storage device 52 or is recorded in a computer-readable recording medium.

The processor 51 acquires the driving environment information 200 from the information acquisition device 20 and stores the driving environment information 200 in the storage device 52.

The processor 51 acquires target route information 300 indicating the target route TR and stores the target route information 300 in the storage device 52. The target route TR is determined based on the current position of the vehicle 1 and a destination. For example, the processor 51 determines the target route TR based on the map information 210 and the position information 220. As another example, a user of the vehicle 1 may designate the target route TR via the HMI unit 40. As still another example, the processor 51 may acquire, through communication, the target route information 300 generated in advance.

The processor 51 acquires permissible level information 400 and stores the permissible level information 400 in the storage device 52. The permissible level information 400 indicates the highest permissible level MLV for each section on the target route TR (refer to FIG. 3). The highest permissible levels MLV are determined in advance. The way in which the highest permissible levels MLV are determined will be described in detail in Section 4 later. The highest permissible levels MLV may be determined by the processor 51 and may be determined by a system outside the vehicle 1. In the latter case, the processor 51 transmits the target route information 300 to an external system and the external system returns the permissible level information 400 relating to the target route TR, to the vehicle control device 50.

In addition, the processor 51 performs vehicle traveling control for controlling the vehicle 1 traveling. Specifically, the processor 51 performs the vehicle traveling control by controlling the traveling device 30. The vehicle traveling control includes steerage control, acceleration control, and deceleration control. The steerage control is performed via the steering device. The acceleration control is performed via the drive device. The deceleration control is performed via the braking device.

The processor 51 performs the driving assistance control by appropriately performing the vehicle traveling control. Specifically, the processor 51 generates a traveling plan needed for the driving assistance control, based on the driving environment information 200. Then, the processor 51 performs the vehicle traveling control such that the vehicle 1 travels according to the traveling plan.

For example, the traveling plan includes a target trajectory including target positions and target speeds. The processor 51 generates the target trajectory based on the map information 210, the position information 220, and the periphery situation information 230. Then, the processor 51 performs the vehicle traveling control such that the vehicle 1 follows the target trajectory.

Particularly, in the present embodiment, driving assistance control performed in a case where the vehicle 1 travels along the target route TR will be described. The processor 51 recognizes the highest permissible level MLV for each section on the target route TR in advance while referring to the permissible level information 400. Then, the processor 51 determines a "selection level SLV" equal to or lower than the highest permissible level MLV, for each section. Typically, the selection level SLV is the highest permissible level MLV. The processor 51 performs the driving assistance control at the selection level SLV when the vehicle 1 travels within a corresponding section.

As shown in FIG. 3, there is a possibility that the highest permissible level MLV fluctuates without being constant along the target route TR. Therefore, the selection level SLV may be switched while the vehicle 1 is traveling along the target route TR. A sensor, information, and the content of processing needed for the driving assistance control depend on the selection level SLV (refer to FIG. 2). In a case where the selection level SLV is switched, the vehicle control device 50 needs to switch a sensor to be used, information, and the content of processing. In addition, there is a case where a traveling plan needs to be re-planned in accordance with the switching of the selection level SLV. Accordingly, when the selection level SLV is switched frequently in a short period of time, a processing load on the vehicle control device 50 is increased and thus the processing performance of the vehicle control device 50 is decreased.

In addition, when the selection level SLV is switched, an operation that the driver of the vehicle 1 is requested to perform may also be changed. For example, when the selection level SLV is switched from LV-C to LV-B, the driver needs to grasp the steering wheel. When the selection level SLV is switched frequently in a short period of time, the driver feels inconvenience.

According to the present embodiment, the processor 51 performs a "level maintenance process" as needed to prevent the selection level SLV from being switched frequently in a short period of time. Hereinafter, the level maintenance process according to the present embodiment will be described.

3. Level Maintenance Process

3-1. Outline

FIG. 6 is a conceptual diagram illustrating an example of the level maintenance process. The horizontal axis represents a position on the target route TR. The vertical axis of the upper graph represents the highest permissible level MLV. The vertical axis of the lower graph represents the selection level SLV.

The target route TR includes a first section INT1, a second section INT2, and a third section INT3. The second section INT2 follows the first section INT1. The third section INT3 follows the second section INT2. In other words, the second section INT2 is interposed between the first section INT1 and the third section INT3. A position XA is a boundary between the first section INT1 and the second section INT2.

A position XB is a boundary between the second section INT2 and the third section INT3.

The highest permissible level MLV in the first section INT1 is a first level LV1. The highest permissible level MLV in the second section INT2 following the first section INT1 is a second level LV2 higher than the first level LV1. That is, the highest permissible level MLV is raised at the position XA. The highest permissible level MLV in the third section INT3 following the second section INT2 is a third level LV3 different from the second level LV2. That is, the highest permissible level MLV is changed at the position XB. In the example shown in FIG. 6, the third level LV3 is equal to the first level LV1.

The selection levels SLV are equal to or lower than the highest permissible levels MLV. For example, the selection level SLV in the first section INT1 is the first level LV1 and the selection level SLV in the third section INT3 is the third level LV3 (=LV1).

With regard to the second section INT2, the selection level SLV can be raised to the second level LV2 higher than the first level LV1. However, in a case where the second section INT2 is short, the selection level SLV is lowered at the position XB immediately after a rise in selection level SLV at the position XA. That is, the selection level SLV is switched frequently in a short period of time.

Therefore, the "level maintenance process" is applied when the second section INT2 is short. Specifically, the selection level SLV in the second section INT2 is maintained at a level equal to the selection level SLV (=LV1) in the first section INT1. Although the selection level SLV can be raised in practice, the selection level SLV is maintained equal intentionally. As a result, the selection level SLV is not switched at at least the position XA. In the example shown in FIG. 6, the selection level SLV is not switched at the position XB also. In this manner, the selection level SLV is restrained from being switched frequently in a short period of time.

FIG. 7 is a conceptual diagram illustrating another example of the level maintenance process. The third level LV3 does not need to be equal to the first level LV1. In the example shown in FIG. 7, the third level LV3 is lower than the first level LV1. The level maintenance process with respect to the second section INT2 is the same as that in the case of the above-described example. As a result of the level maintenance process, the selection level SLV is not switched at the position XA. The selection level SLV is lowered at the position XB. In the present example as well, the selection level SLV is restrained from being switched frequently in a short period of time.

FIG. 8 is a conceptual diagram illustrating still another example of the level maintenance process. In the example shown in FIG. 8, the third level LV3 is higher than the second level LV2. The level maintenance process with respect to the second section INT2 is the same as that in the case of the above-described example. As a result of the level maintenance process, the selection level SLV is not switched at the position XA. The selection level SLV is raised at the position XB. In the present example as well, the selection level SLV is restrained from being switched frequently in a short period of time.

3-2. Process Performed by Vehicle Control Device

FIG. 9 is a flowchart illustrating a process relating to the driving assistance control that is performed by the vehicle control device 50 (processor 51) according to the present embodiment.

In step S100, the processor 51 provisionally determines the selection level SLV for each section on the target route TR. Specifically, the processor 51 provisionally determines, based on the permissible level information 400, the selection level SLV equal to or lower than the highest permissible level MLV, for each section. For example, the processor 51 sets the highest permissible levels MLV as the selection levels SLV, provisionally.

In step S200, the processor 51 extracts the second section INT2 while referring to the permissible level information 400. The second section INT2 is a section where the highest permissible level MLV is raised to be higher than that in a preceding section (first section INT1).

In step S300, the processor 51 estimates a passage time taken for the vehicle 1 to pass through the second section INT2. The passage time is estimated based on the length of the second section INT2 and information about the vehicle speed in the second section INT2. The length of the second section INT2 (distance between position XA and position XB) is obtained from the permissible level information 400. There are various examples of the information about the vehicle speed in the second section INT2.

For example, the vehicle speed in a section preceding the second section INT2 (example: first section INT1) is used as the vehicle speed in the second section INT2. This is because it is considered that there are a small number of reasons for a decrease in vehicle speed since the highest permissible level MLV is raised in the second section INT2. The vehicle speed in the section preceding the second section INT2 is obtained from the vehicle state information 240 while the vehicle is traveling in the section.

As another example, a speed history of the vehicle 1 in the second section INT2 is used. In a case where the vehicle 1 has traveled along the target route TR in the past, a vehicle speed indicated by the vehicle state information 240 is recorded. Speed history information indicating the history of the vehicle speed is created in advance and is stored in the storage device 52. The speed history in the second section INT2 is obtained from the speed history information.

As still another example, the speed limit in the second section INT2 is used as the vehicle speed in the second section INT2. This is because it is considered that there are a small number of reasons for a decrease in vehicle speed since the highest permissible level MLV is raised in the second section INT2. Information about the speed limit is included in the map information 210, for example.

In step S400, the processor 51 determines whether a level maintenance condition is satisfied or not. The level maintenance condition is a condition for performing the level maintenance process. For example, the level maintenance condition is that the length of the second section INT2 is smaller than a predetermined length threshold value. Alternatively, the level maintenance condition is that the passage time estimated in step S300 is smaller than a predetermined passage time threshold value. In a case where the level maintenance condition is satisfied (step S400: Yes), the process proceeds to step S500. Meanwhile, in a case where the level maintenance condition is not satisfied (step S400: No), the process proceeds to step S600.

In step S500, the processor 51 applies the level maintenance process with respect to the second section. Specifically, the processor 51 maintains the selection level SLV in the second section INT2 at a level equal to the selection level SLV in the first section INT1. In other words, the processor 51 does not switch the selection level SLV at a boundary (position XA) between the first section INT1 and the second section INT2. Thereafter, the process proceeds to step S600.

In step S600, the processor 51 performs the driving assistance control at the selection level SLV.

When the vehicle 1 is about to reach the second section INT2, the processor 51 may notify the driver that the level maintenance process has been applied, through the HMI unit 40. For example, the driver is notified of a message indicating that "the vehicle will be driven at the first level LV1 in this section" by means of a voice or a display.

3-3. Effect

As described above, according to the present embodiment, the level maintenance process is performed with respect to the second section INT2 in a case where the level maintenance condition is satisfied. Due to the level maintenance process, the selection level SLV in the second section INT2 is maintained at a level equal to the selection level SLV in the first section INT1. Although the selection level SLV can be raised in practice, the selection level SLV is maintained equal intentionally. Accordingly, the selection level SLV is restrained from being switched frequently in a short period of time. Since the selection level SLV is restrained from being switched frequently, a decrease in processing performance of the vehicle control device 50 is also suppressed.

In addition, when the selection level SLV is switched, an operation that the driver of the vehicle 1 is requested to perform may also be changed. When the selection level SLV is switched frequently in a short period of time, the driver feels inconvenience. According to the present embodiment, since the selection level SLV is restrained from being switched frequently, inconvenience that the driver feels is reduced.

3-4. Modification Example

The processor 51 may enable or disable the level maintenance process according to the present embodiment in accordance with designation from the user of the vehicle 1. For example, the user of the vehicle 1 designates whether the level maintenance process is to be ON or OFF by using the HMI unit 40 (input device). In a case where the user designates that the level maintenance process is to be ON, the processor 51 enables the level maintenance process. In a case where the user designates that the level maintenance process is to be OFF, the processor 51 disables the level maintenance process. Accordingly, the convenience of the user is improved.

4. Example of Method of Determining Highest Permissible Level

Next, an example of a method of determining the highest permissible level MLV for the driving assistance control will be described.

4-1. Evaluation Value of Map Information

As described above, the driving assistance control is performed based on the map information 210. The map information 210 includes high-level map information MAP in addition to a general roadmap information indicating the arrangement of lanes or the shape or a road. For example, the high-level map information MAP indicates the position of a stationary object on a road (example: guardrail and wall), a road surface, a characteristic object (example: white line, pole, and signboard), or the like. The position mentioned here is an absolute position and is defined in an absolute coordinate system (latitude, longitude, and altitude).

As shown in FIG. 10, the map information MAP is associated with an "evaluation value P" of the map information MAP. The evaluation value P indicates the certainty of the map information MAP, for each position in the absolute coordinate system. For example, in the case of the map information MAP that indicates the position of a characteristic object, the evaluation value P indicates the certainty that the characteristic object is present at the position indicated by the map information MAP. The "certainty" can be paraphrased as "accuracy" or "reliability". The "evaluation value P" can be paraphrased as "quality" or a "score".

The higher the evaluation value P of the map information MAP, the higher the accuracy of the driving assistance control performed by using the map information MAP and the higher the level of the driving assistance control that can be performed. Accordingly, in the present embodiment, the highest permissible level MLV for the driving assistance control is determined based on the evaluation value P of the map information MAP.

FIG. 11 is a conceptual diagram for describing an example of a method of determining the highest permissible levels MLV. The horizontal axis represents a position on the target route TR. The vertical axis represents the evaluation value P.

As shown in FIG. 11, a threshold value TH is set for each driving assistance level. The threshold value TH is the minimum evaluation value P needed for performing the driving assistance control at each driving assistance level with a sufficient accuracy. In other words, the threshold value TH is the minimum evaluation value P needed for permitting each driving assistance level. For example, a threshold value TH-C is the minimum evaluation value P needed for permitting the driving assistance level LV-C. In a case where the evaluation value P is smaller than the threshold value TH-C, the driving assistance level LV-C is not permitted. Meanwhile, in a case where the evaluation value P is equal to or larger than the threshold value TH-C, the driving assistance level LV-C is permitted.

The highest permissible level MLV is the highest permissible driving assistance level. For example, in a section between a position X1 and a position X2, the highest permissible level MLV is the driving assistance level LV-D. In a section between a position X3 and a position X4, the highest permissible level MLV is the driving assistance level LV-B. In a section between a position X5 and a position X6, the highest permissible level MLV is the driving assistance level LV-E.

As described above, the highest permissible level MLV is determined based on comparison between the evaluation value P and the threshold value TH. The highest permissible level MLV in a section where the evaluation value P is equal to or larger than the threshold value TH is higher than the highest permissible level MLV in a section where the evaluation value P is smaller than the threshold value TH.

4-2. Map Information System

Figure 12:
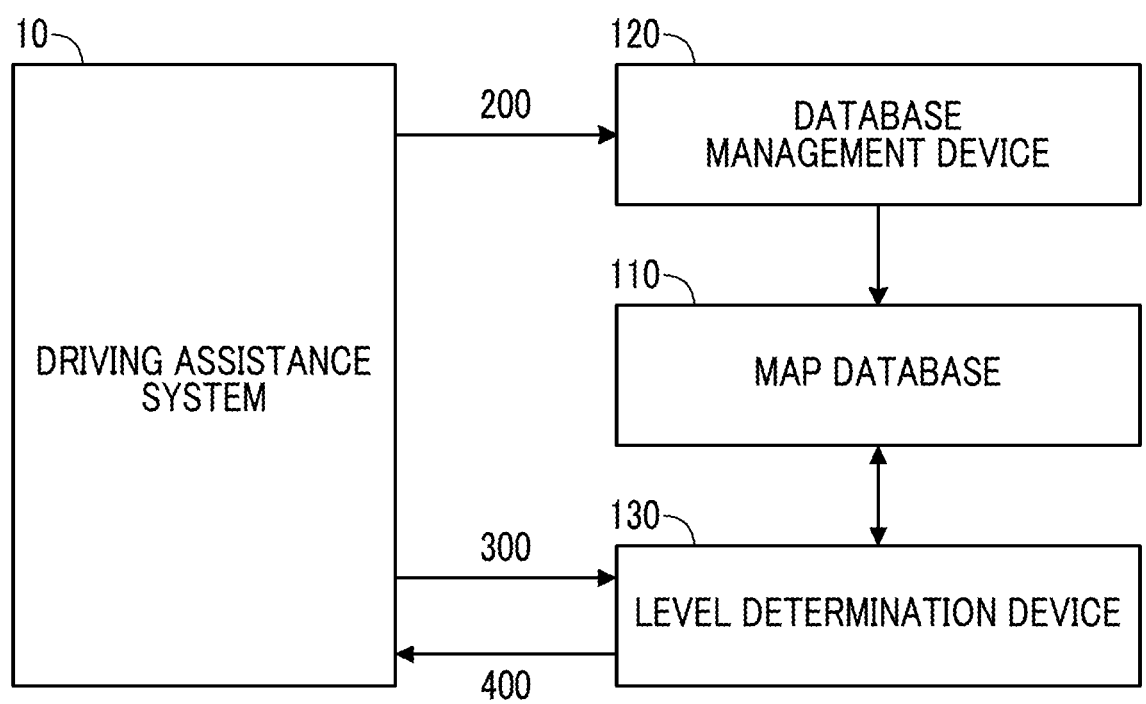
FIG. 12 is a block diagram schematically illustrating the configuration of a map information system according to the embodiment of the present disclosure.

FIG. 12 is a block diagram schematically illustrating the configuration of a map information system 100 according to the present embodiment. The map information system 100 is a system that manages and uses the map information MAP. More specifically, the map information system 100 includes a map database 110, a database management device 120, and a level determination device 130.

The map database 110 is an aggregate of the map information MAP used for the driving assistance control. The map database 110 is stored in a predetermined storage device.

The database management device 120 manages the map database 110. More specifically, the database management device 120 acquires the driving environment information 200 from the driving assistance system 10 and manages the map database 110 based on the driving environment information 200. The management of the map database 110 includes management (generation and update) of the map information MAP and the evaluation value P.

For example, the map information MAP indicating the position of a characteristic object (example: white line, pole, and signboard) will be described. The database management device 120 detects a characteristic object based on the periphery situation information 230. In addition, the database management device 120 calculates the absolute position of the characteristic object from a position where the characteristic object is detected and the position information 220. Each time the vehicle 1 travels on the same road, the same characteristic object is detected repeatedly. With the absolute position of the same characteristic object being calculated repeatedly, the map information MAP is updated.

The evaluation value P indicates the certainty that the characteristic object is present at a position indicated by the map information MAP. For example, the evaluation value P is low when the number of times of detection of the characteristic object is small, and the evaluation value P becomes higher as the number of times of detection increases. In addition, the more the calculated positions of the characteristic object are scattered, the lower the evaluation value P. Each time the vehicle 1 travels on the same road, the map information MAP and the evaluation value P thereof are updated.

The level determination device 130 automatically determines the highest permissible level MLV for the driving assistance control. Specifically, the level determination device 130 determines the highest permissible level MLV based on the evaluation value P associated with the map information MAP (refer to FIG. 11).

For example, the level determination device 130 receives the target route information 300 indicating the target route TR from the driving assistance system 10. The level determination device 130 acquires the evaluation value P associated with the map information MAP along the target route TR, from the map database 110. Then, the level determination device 130 determines, based on the evaluation value P, the highest permissible level MLV for each section on the target route TR. The level determination device 130 generates the permissible level information 400 indicating the highest permissible level MLV for each section on the target route TR and transmits the permissible level information 400 to the driving assistance system 10.

Note that, the map information system 100 may be installed in the vehicle 1 and may be disposed in a management server outside the vehicle 1. Alternatively, the map information system 100 may be disposed in the vehicle 1 and the management server in a dispersive manner. At least a portion of the map information system 100 may be included in the driving assistance system 10.

4-3. Effect

As described above, according to the present embodiment, the highest permissible level MLV is determined based on the evaluation value P of the map information MAP. Since the evaluation value P of the map information MAP is considered, the highest permissible level MLV is determined appropriately. As a result, the convenience of the driver of the vehicle 1 is improved. In addition, inappropriate driving assistance control is suppressed and thus there is an improvement in safety.

For example, in a case where the evaluation value P of the map information MAP is low, there is a possibility that the accuracy of the driving assistance control based on the map information MAP is also decreased. In this case, the highest permissible level MLV is also lowered automatically and the driving assistance control is performed within a reasonable range. As a result, the driver is less likely to feel a sense of incompatibility with respect to the driving assistance control. Meanwhile, in a case where the evaluation value P of the map information MAP is high, it is possible to perform high-level driving assistance control with a sufficient accuracy. In this case, the highest permissible level MLV becomes high and thus the convenience of the driver is improved.

5. Information Displaying Process

Figure 13:
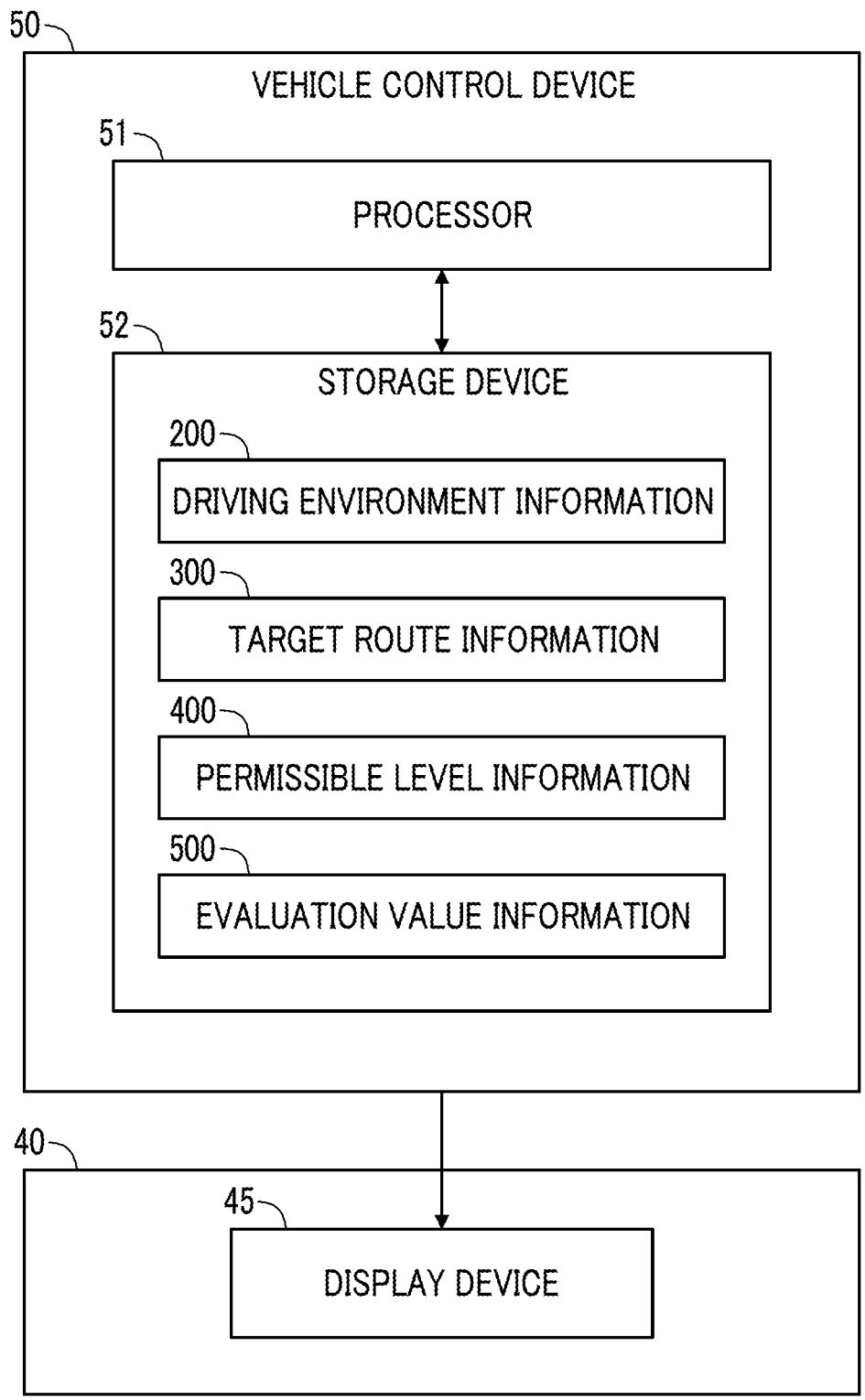
FIG. 13 is a block diagram illustrating a configuration relating to an information displaying process performed by the vehicle control device according to the embodiment of the present disclosure.

FIG. 13 is a block diagram illustrating a configuration relating to an information displaying process performed by the vehicle control device 50 according to the present embodiment. The HMI unit 40 includes a display device 45. The processor 51 performs the information displaying process of causing the display device 45 to display information that needs to be displayed.

The storage device 52 may further store evaluation value information 500. The evaluation value information 500 indicates the evaluation value P for each position on the target route TR. The evaluation value information 500 is obtained from the map information system 100 (map database 110).

5-1. First Example

FIG. 14 is a conceptual diagram for describing a first example of the information displaying process. The horizontal axis represents a time or a position along the target route TR. The vertical axis represents the evaluation value P. The processor 51 causes the display device 45 to display a temporal or positional change in evaluation value P along the target route TR, based on the evaluation value information 500.

Furthermore, the processor 51 may cause the display device 45 to display a correspondence between the evaluation value P and the driving assistance level. In an example shown in FIG. 14, icons representing driver operations (example: eyes-off, hands-off, hands-on) at respective driving assistance level are shown. The driver can recognize a prospective change in driving assistance control level in advance.

However, in a case where the level maintenance process is performed with respect to the second section INT2, the actual selection level SLV in the second section INT2 does not coincide with the highest permissible level MLV corresponding to the evaluation value P. Therefore, the processor 51 makes a display mode for the evaluation value P with respect to the second section INT2 different from a display mode for the evaluation value P with respect to other sections. Examples of the display mode include a color, a line type, and a line width. Accordingly, it is possible to clearly notify the driver that the level maintenance process is performed and the selection level SLV does not coincide with the evaluation value P. That is, there is an improvement in convenience.

5-2. Second Example

FIG. 15 is a conceptual diagram for describing a second example of the information displaying process. The same description as that in the first example will be appropriately omitted. In the second example, the processor 51 changes the "apparent evaluation value P" displayed on the display device 45.

In an example shown in FIG. 15, the selection level SLV in the first section INT1 immediately before the second section INT2 is, LV-B. A first evaluation value range is a range of the evaluation values P corresponding to the selection level SLV (=LV-B) in the first section INT1. In a case where the level maintenance process is performed with respect to the second section INT2, the processor 51 corrects the evaluation value P in the second section INT2 to fall within the first evaluation value range. Then, the processor 51 causes the display device 45 to display the evaluation value P after the correction. Accordingly, there is no discrepancy between contents displayed and actual contents of control. As a result, a sense of incompatibility that the driver feels is reduced and there is an improvement in convenience.

5-3. Third Example

In a third example, the processor 51 causes the display device 45 to display a change in highest permissible level MLV along the target route TR (refer to FIG. 3), based on the permissible level information 400.

However, in a case where the level maintenance process is performed with respect to the second section INT2, the actual selection level SLV in the second section INT2 does not coincide with the highest permissible level MLV. Therefore, the processor 51 makes a display mode for the highest permissible level MLV with respect to the second section INT2 different from a display mode for the highest permissible level MLV with respect to other sections. Examples of the display mode include a color, a line type, and a line width. Accordingly, it is possible to clearly notify the driver that the level maintenance process is performed and the selection level SLV does not coincide with highest permissible level MLV. That is, there is an improvement in convenience.

5-4. Fourth Example

In a fourth example, the processor 51 causes the display device 45 to display a change in selection level SLV along the target route TR while displaying no highest permissible level MLV. Accordingly, there is no discrepancy between contents displayed and actual contents of control. As a result, a sense of incompatibility that the driver feels is reduced and there is an improvement in convenience.

5-5. Fifth Example

As long as there is no contradiction, two or more of the first to fourth examples may be combined with each other.

What is claimed is:

1. A vehicle control device configured to perform driving assistance control which assists in driving a vehicle, the device comprising:
   a storage device in which permissible level information indicating a highest permissible level of the driving assistance control for each of sections on a target route is stored; and
   a processor configured to determine, based on the permissible level information, a selection level equal to or lower than the highest permissible level for each of the sections and to perform the driving assistance control at the selection level, wherein:
   the target route includes a first section in which the highest permissible level is a first level, a second section that follows the first section and in which the highest permissible level is a second level higher than the first level, and a third section that follows the second section and in which the highest permissible level is a third level different from the second level;
   in a case where a length of the second section or a passage time taken for the vehicle to pass through the second section is smaller than a threshold value, the processor performs a level maintenance process of maintaining the selection level in the second section at a level equal to the selection level in the first section;
   the processor causes a display device to display a change in highest permissible level along the target route based on the permissible level information; and
   the processor makes a display mode for the highest permissible level with respect to the second section different from a display mode for the highest permissible level with respect to other sections in a case where the level maintenance process is performed.

2. The vehicle control device according to claim 1, wherein the processor estimates the passage time based on a speed of the vehicle in a section preceding the second section, a speed history of the vehicle in the second section, or a speed limit in the second section.

3. The vehicle control device according to claim 1, wherein the processor enables or disables the level maintenance process in accordance with designation of a user of the vehicle.

4. The vehicle control device according to claim 1, wherein:
   the processor performs the driving assistance control based on map information;
   an evaluation value of the map information indicates certainty of the map information for each of positions in an absolute coordinate system;
   the highest permissible level is determined in advance based on the evaluation value; and
   the highest permissible level determined in a case where the evaluation value is equal to or larger than a threshold value is higher than the highest permissible level determined in a case where the evaluation value is smaller than the threshold value.

5. The vehicle control device according to claim 4, wherein:
   evaluation value information indicating the evaluation value for each of the positions on the target route is further stored in the storage device; and
   the processor causes a display device to display a change in evaluation value along the target route, based on the evaluation value information.

6. The vehicle control device according to claim 5, wherein the processor makes a display mode for the evaluation value with respect to the second section different from a display mode for the evaluation value with respect to other sections in a case where the level maintenance process is performed.

7. The vehicle control device according to claim 5, wherein:
   a first evaluation value range is a range of evaluation values corresponding to the selection level in the first section; and
   the processor corrects the evaluation value in the second section to fall within the first evaluation value range and causes the display device to display the evaluation value after the correction in a case where the level maintenance process is performed.

8. The vehicle control device according to claim 1, wherein the processor causes a display device to display a change in selection level along the target route while displaying no highest permissible level.

9. A vehicle control device configured to perform driving assistance control which assists in driving a vehicle, the device comprising:
   a storage device in which permissible level information indicating a highest permissible level of the driving assistance control for each of sections on a target route is stored; and
   a processor configured to determine, based on the permissible level information, a selection level equal to or lower than the highest permissible level for each of the sections and to perform the driving assistance control at the selection level, wherein:
   the target route includes a first section in which the highest permissible level is a first level, a second section that follows the first section and in which the highest permissible level is a second level higher than the first level, and a third section that follows the second section and in which the highest permissible level is a third level different from the second level;
   in a case where a length of the second section or a passage time taken for the vehicle to pass through the second section is smaller than a threshold value, the processor performs a level maintenance process of maintaining the selection level in the second section at a level equal to the selection level in the first section;
   the processor performs the driving assistance control based on map information;
   an evaluation value of the map information indicates certainty of the map information for each of positions in an absolute coordinate system;
   the highest permissible level is determined in advance based on the evaluation value;
   the highest permissible level determined in a case where the evaluation value is equal to or larger than a threshold value is higher than the highest permissible level determined in a case where the evaluation value is smaller than the threshold value;
   evaluation value information indicating the evaluation value for each of the positions on the target route is further stored in the storage device;
   the processor causes a display device to display a change in evaluation value along the target route, based on the evaluation value information; and
   the processor makes a display mode for the evaluation value with respect to the second section different from a display mode for the evaluation value with respect to other sections in a case where the level maintenance process is performed.

10. A vehicle control device configured to perform driving assistance control which assists in driving a vehicle, the device comprising:
   a storage device in which permissible level information indicating a highest permissible level of the driving assistance control for each of sections on a target route is stored; and
   a processor configured to determine, based on the permissible level information, a selection level equal to or lower than the highest permissible level for each of the sections and to perform the driving assistance control at the selection level, wherein:
   the target route includes a first section in which the highest permissible level is a first level, a second section that follows the first section and in which the highest permissible level is a second level higher than the first level, and a third section that follows the second section and in which the highest permissible level is a third level different from the second level;
   in a case where a length of the second section or a passage time taken for the vehicle to pass through the second section is smaller than a threshold value, the processor performs a level maintenance process of maintaining the selection level in the second section at a level equal to the selection level in the first section;
   the processor performs the driving assistance control based on map information;
   an evaluation value of the map information indicates certainty of the map information for each of positions in an absolute coordinate system;
   the highest permissible level is determined in advance based on the evaluation value;
   the highest permissible level determined in a case where the evaluation value is equal to or larger than a threshold value is higher than the highest permissible level determined in a case where the evaluation value is smaller than the threshold value;
   evaluation value information indicating the evaluation value for each of the positions on the target route is further stored in the storage device;
   the processor causes a display device to display a change in evaluation value along the target route, based on the evaluation value information;
   a first evaluation value range is a range of evaluation values corresponding to the selection level in the first section; and
   the processor corrects the evaluation value in the second section to fall within the first evaluation value range and causes the display device to display the evaluation value after the correction in a case where the level maintenance process is performed.

\* \* \* \* \*